United States Patent
Etzioni et al.

(10) Patent No.: US 9,454,622 B2
(45) Date of Patent: Sep. 27, 2016

(54) EDUCATIONAL HUB

(71) Applicants: Doron Etzioni, Jersey City, NJ (US); Daniel Harris Etzioni, Jersey City, NJ (US)

(72) Inventors: Doron Etzioni, Jersey City, NJ (US); Daniel Harris Etzioni, Jersey City, NJ (US)

(*) Notice: Subject to any disclaimer, the term of this patent is extended or adjusted under 35 U.S.C. 154(b) by 199 days.

(21) Appl. No.: 14/205,079

(22) Filed: Mar. 11, 2014

(65) Prior Publication Data
US 2014/0280195 A1    Sep. 18, 2014

Related U.S. Application Data

(60) Provisional application No. 61/788,684, filed on Mar. 15, 2013.

(51) Int. Cl.
G06F 17/30    (2006.01)
G06F 7/00    (2006.01)

(52) U.S. Cl.
CPC .............. *G06F 17/30997* (2013.01)

(58) Field of Classification Search
CPC ............ G06F 17/30864; G06F 17/30554; G06F 17/30675; G06F 3/0482; G06F 17/30657
USPC ........................................... 707/741
See application file for complete search history.

(56) References Cited

U.S. PATENT DOCUMENTS

| | | | |
|---|---|---|---|
| 5,794,006 A | 8/1998 | Sanderman | |
| 5,797,754 A | 8/1998 | Griswold et al. | |
| 6,024,577 A | 2/2000 | Wadahama et al. | |
| 6,029,043 A | 2/2000 | Ho et al. | |
| 6,091,930 A | 7/2000 | Mortimer et al. | |
| 6,125,358 A | 9/2000 | Hubbell et al. | |
| 6,331,865 B1 | 12/2001 | Sachs et al. | |
| 6,347,333 B2 | 2/2002 | Eisendrath et al. | |
| 6,381,444 B1 | 4/2002 | Aggarwal et al. | |
| 6,652,287 B1 * | 11/2003 | Strub ............. | G09B 5/00 434/322 |
| 6,965,752 B2 | 11/2005 | Allen et al. | |
| 6,975,833 B2 | 12/2005 | Theilmann et al. | |
| 6,987,945 B2 | 1/2006 | Corn et al. | |
| 7,103,848 B2 | 9/2006 | Barsness et al. | |
| 7,242,389 B1 | 7/2007 | Stern | |
| 7,246,118 B2 | 7/2007 | Chastain et al. | |
| 7,506,246 B2 | 3/2009 | Hollander et al. | |
| 7,918,666 B1 | 4/2011 | Lewolt | |
| 8,118,224 B2 | 2/2012 | Barsness et al. | |
| 8,170,465 B2 | 5/2012 | Griffin | |
| 2003/0093790 A1 * | 5/2003 | Logan ............ | G06F 17/30265 725/38 |
| 2005/0227216 A1 | 10/2005 | Gupta | |
| 2007/0150355 A1 * | 6/2007 | Meggs ............ | G06Q 30/02 705/14.17 |
| 2009/0271481 A1 | 10/2009 | Becker | |
| 2010/0095198 A1 | 4/2010 | Bultrowicz et al. | |
| 2010/0325559 A1 | 12/2010 | Westerinen et al. | |
| 2012/0036423 A1 | 2/2012 | Haynes, II et al. | |
| 2012/0156668 A1 | 6/2012 | Zelin | |
| 2012/0221937 A1 | 8/2012 | Patterson et al. | |

(Continued)

*Primary Examiner* — Kuen Lu
(74) *Attorney, Agent, or Firm* — Fish & Richardson P.C.

(57) ABSTRACT

In an example implementation, a global educational hub provides academic users with collaboration tools to exchange and build on the accumulated knowledge of subjects of interest. Users are provided with a central location to collect, categorize, and rank resources, and store notes and comments related to a particular section of an electronic textbook being studied. Users also can refer to online resources, such as web services, multimedia, website pages, newsgroups, search engine results, RSS, any other current and future external resources, and other user's notes.

30 Claims, 8 Drawing Sheets

(56) References Cited

U.S. PATENT DOCUMENTS

| | | | | |
|---|---|---|---|---|
| 2012/0310961 A1* | 12/2012 | Callison | | G06F 17/30867 707/756 |
| 2013/0111363 A1* | 5/2013 | Linton | | G06Q 10/06 715/753 |
| 2014/0164507 A1* | 6/2014 | Tesch | | H04L 51/10 709/204 |
| 2014/0279188 A1* | 9/2014 | Powell | | G06Q 30/0631 705/26.7 |

* cited by examiner

FIG. 4

EDUCATIONAL HUB

TECHNICAL FIELD

This disclosure relates to computer-implemented educational hubs for obtaining, sharing, and discussing educational content.

BACKGROUND

Electronic academic collaboration systems allow users (e.g., students and instructors) to obtain, share, and discuss educational content with other users. However, existing solutions often fail to address the major challenges faced by their users, and are often limited by the content provider. For example, search engines provide results based on key words in a search criterion, and order the results set by predicting the applicability of each result according to mathematical or financial algorithms. However, search engines rely heavily on the inputted search criteria, and often fail to accurately determine if results are applicable to the academic user's subject of interest, and often do not consider if the returned results also would be applicable to other users having the same subject of interest. As another example, electronic textbooks and on-line educational resources focus on providing learning material, and often include links to other related resources. However, these linked resources typically are limited to specific author-selected content. Further, these resources often are static, and thus fail to account for the ever-changing wealth of available data and information. Therefore, the foregoing solutions do not provide a global accumulative knowledge collaboration mechanism for finding and sharing dynamically evolving content.

SUMMARY

In general, in an aspect, a method for facilitating collaboration between users includes obtaining, from a plurality of user devices monitoring information corresponding to monitored interactions between a plurality of users and at least one electronic resource, and content identified by each user as relevant to the at least one electronic resource. The method also includes indexing, on a server system, the content based on the monitoring information, identifying indexed content relevant to a particular user based on the monitoring information received from that user and based at least in part on a particular portion of the electronic resource being viewed by that user on the user's device, and displaying, on the particular user's device, content relevant to that user.

Implementations of this aspect may include or more of the following features.

In some implementations, the at least one electronic resource can be an electronic textbook. In some implementations, the content can include another electronic resource. The content can include a comment, note, or annotation created by the user. The content can include a reference to another electronic source, a website, a service, or an advertisement.

In some implementations, displaying content relevant to a particular user includes displaying content in a list prioritized according to relevance. In some implementations, the method also includes automatically updating the list based on the monitoring information.

In some implementations, the method also includes obtaining, from each user's device, feedback information regarding displayed content. Identifying indexed content relevant to a particular user can be further based on feedback information received from each user.

In some implementations, monitoring information is obtained automatically from the plurality of user devices. The monitoring information can correspond to an identity of at least one electronic resource. The monitoring information obtained from each user can correspond to one or more key words associated with the portion of the at least one electronic resource being viewed by that user.

In some implementations, identifying indexed content relevant to a particular user can be further based on a popularity of the content. In some cases, identifying indexed content relevant to a particular user can be further based on the popularity of the content with respect to a subset of the plurality of users. The subset of users can be users who are similar with respect to at least one pre-determined criterion. The criterion can correspond to an academic course currently taken by the users. The criterion can correspond to an academic institution currently attended by the users. The subset of users can be selected by the particular user.

In general, in another aspect, a system includes a receiver module configured to obtain, from a plurality of user devices, monitoring information corresponding to monitored interactions between a plurality of users and at least one electronic resource, and content identified by each user as relevant to the at least one electronic resource. The system also includes a database module configured to index the content based on the monitoring information, and identify indexed content relevant to each particular user based on the monitoring information received from that user's device and based at least in part on a particular portion of the electronic resource being viewed by that user on the user's device. The system also includes a transmitter module configured to transmit, to each user's device, the content identified as relevant to that user.

Implementations of this aspect may include or more of the following features.

In some implementations, the at least one electronic resource can be an electronic textbook. The content can include a comment, note, or annotation created by the user. The content can include a reference to another electronic source, a website, a service, or an advertisement.

In some implementations, the receiver module can be configured to obtain monitoring information automatically from the plurality of user devices. The monitoring information can correspond to an identity of at least one electronic resource. The monitoring information obtained from each user can correspond to one or more key words associated with a portion of the at least one electronic resource being viewed by that user.

In general, in another aspect, a system apparatus includes a monitoring module configured to monitor interactions between a user and at least one electronic resource, and to generate monitoring information based on the monitored interactions. The system also includes a content input module configured to receive, from the user, content identified by the user as relevant to the at least one electronic resource. The system also includes a transmitter module configured to transmit the monitoring information and the content to a server. The system also includes a receiver module configured to receive content relevant to the user from the server, where the content relevant to the user is based on the monitoring information received from that user and based at least in part on a particular portion of the electronic resource presented by the apparatus. The system also includes a display configured to display the content relevant to the user.

Implementations of this aspect may include or more of the following features.

In some implementations, the at least one electronic resource can be an electronic textbook. The content can include another electronic resource. The content can include a comment, note, or annotation created by the user.

The details of one or more implementations are set forth in the accompanying drawings and the description below. Other aspects, features, and advantages will be apparent from the description and drawings, and from the claims.

BRIEF DESCRIPTION OF THE DRAWINGS

FIG. 4 shows a further example screen capture of a user's device.

DETAILED DESCRIPTION

Figure 1A:
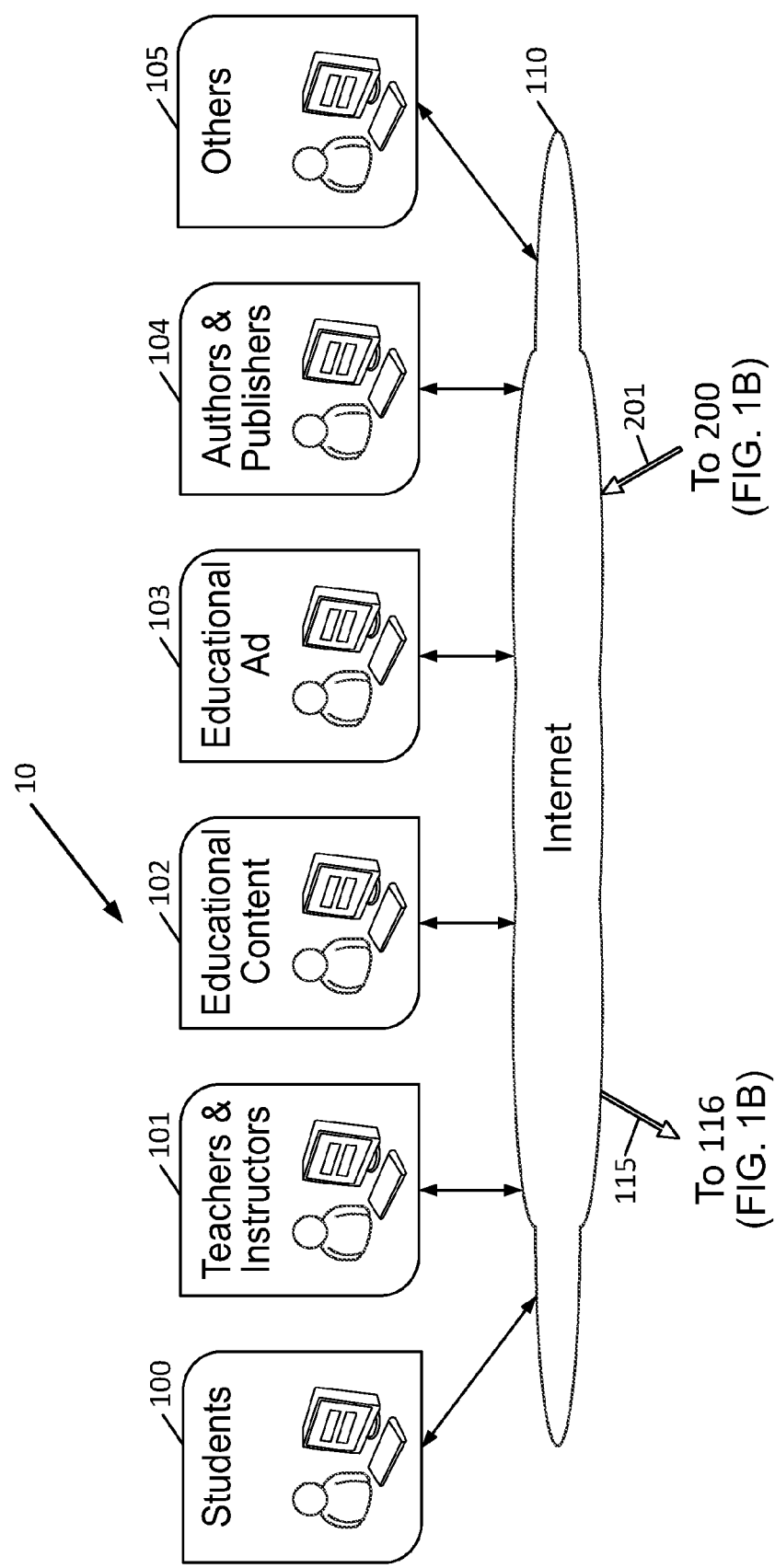
FIGS. 1A-D show an example of an educational hub.

The present disclosure describes implementations of an educational hub. Implementations of the hub provide academic users with collaboration tools to exchange and build on the accumulated knowledge of subjects of interest. The system can be used by any student, at any level of education, and in any language, as long as the user has access to a network (e.g., a LAN or the Internet), or has access to a device capable of storing cached data related to specific studying material. In addition to applications in the field of academic education, the system also can be used as a hub to collect information, share knowledge, and collaborate on any source of academic content.

By using one or more of the implementations described below, students are provided with a central location to collect, categorize, and rank resources, and store notes and comments related to a particular section of an electronic textbook being studied. Each user can refer to online resources, such as web services, multimedia, website pages, newsgroups, search engine results, RSS, any other current and future external resources, as well as other users' notes and comments.

In an example implementation, a user's device is provided with a client application, which monitors the user's interactions with an electronic textbook. In some implementations, the client application collects information about the textbook being viewed by the user (e.g., information identifying the textbook's title, author, revision number, subject matter, currently viewed section, and so forth). In some instances, the client application collects information about the content of the textbook (e.g., information describing the subject matter of the textbook, and information pertaining to an ontological interpretation of the textbook or textbook section being viewed, such as a selection of key words or phrases). The client application also can collect information pertaining to external content that the user finds relevant, interesting, or important. As an example, the client application can collect links to external resources (e.g., web sites, services, applications, textbooks and tutors), or content created by the user (e.g., user created comments, notes, annotations, and ranking/ratings for particular resources). In some implementations, the client application can collect information pertaining to the behavior of the user (e.g., information describing how long a user spends on a particular section of the textbook, the frequency with which the user views particular sections of the textbook, and the amount of time the user spend viewing the textbook compared to external resources). Other information can be collected, depending on the implementation. The client application sends this collected information to the education hub.

The education hub stores and indexes the received information for future retrieval. The education hub can index this information in various ways. For example, in some implementations, the education hub indexes this information based on the identity of a textbook or the content, an ontological interpretation of a textbook or content, and the user from whom the information was obtained. Other indexing methods can be used, depending on the implementation.

As the education hub continues to collect information from its users, a user can retrieve relevant information from the education hub for review. This retrieval can occur, for example, automatically or semi-automatically. In an example, as a user reviews an electronic textbook on his device, the installed client application can monitor the user's interactions with the textbook, and can request relevant information from the education hub. As an example, the education hub can send indexed information to the client application based on the identity of the textbook or textbook section being viewed by the user, an ontological interpretation of the indexed content, or an ontological interpretation of the content of the textbook or textbook section being viewed. In some implementations, the education hub can send indexed information collected from a subset of its users (e.g., users who speak a particular language, users taking a particular course at a university, users having a similar instructor, or users being "followed" by the current user). In some implementations, this information can be prioritized and ranked according to its predicted relevance (e.g., according to the information's predicted relevance to the user or with respect to a particular textbook section currently being viewed by the user). Other methods for determining and sending relevant information can be used, depending on the implementation.

The relevant information can be presented to the user for review, for example, in a user interface window that he can view alongside the electronic textbook. The user can select one or more items of interest to learn more about the selected resource. In some implementations, as the user browses through the electronic textbook, this user interface window can continuously update in order to present the user with information relevant to the currently viewed textbook section. In some implementations, the user can re-order, prioritize, or rank the displayed information as desired, and this information can be sent to the education hub to refine future requests made by any of its users.

In some implementations, a student can decide on the period of time that his comments, notations, or other generated content should be private (e.g., limited to the school year calendar). Once that time expires, the user's generated content and the resource can become available to any other educational hub member to refer, view and expand on the accumulated knowledge.

In some implementations, third parties (e.g., non-student or non-instructor users) can enhance the subject being viewed, for example, by providing additional subject-relevant material. For example, if the student is learning a formula in algebra, other students or companies can develop an application that can take the student through each step of resolving that formula, and other students, ranked by the Educational Hub students' community, can provide online tutoring (e.g., using a whiteboard, chat room, video chat, or any other future technology). Those types of services can be provided as a free service or fee-based services. The educational hub can use different techniques to identify and rank the applicability of the resource in providing the student with needed help. For instance, the students can rank the solution and save it as a reference for future studying. In an example implementation, a high ranking can indicate to the system that the resource was valuable. In some implementations, the system can identify the applicability of a particular resource based on time (e.g., how long a particular user interacted with a resource), and how a user interacted with the resource. As an example, while the user interacts with the external resource, the system collects and analyzes information about this interaction, combines this information with demographic data (e.g., school, school year, and electronic textbook information), and stores the information with reference to the resource on the system for future analysis. The system can, for example, further analyze this information to determine the applicability of the collected resource to comparable students (e.g., students from the same school, students attending a similar course, students interested in the same subject matter, and so forth).

In some implementations, end users of the system can be required to register only once, but can play a different role as related to a specific subject. For example, a user can have a student role in Algebra II class, and at the same time provide tutoring for students in Algebra I. In another example, a high school teacher can have the role of a teacher for subjects that he is teaching, and the role of a student while he is completing his Master's degree. At the same time, the teacher can be the author of an educational textbook that he wrote.

An education resource hub can be implemented in various ways. An example implementation of an educational hub 10 is shown in FIGS. 1A-D. Hub 10 allows for multiple users and content providers (e.g., clients 100-105) to connect via a network (e.g., the Internet 110). As shown in FIG. 1A, example clients can include students 100, teachers and instructors 101, education content providers 102, education advertisement providers 103, publishers and authors 104, and other contributors 105.

A student user (SU) 100 can be a primary beneficiary of the system. In an example implementation, a SU 100 views material in an electronic textbook interface, and views and exchanges accumulated knowledge related the material. This accumulated knowledge can enhance the learning experience of the SU 100, for example by providing relevant material that is focused on the subject at hand. This accumulated knowledge can be provided by other SUs 100, teachers and instructors 101, educational providers 102, other users and providers, or by a combination or different users and providers. One goal of the hub 10 is to help keep the SU 100 focused on the material being studied, and to provide an enhanced learning experience with relevant information based on other students' rankings of particular resources and services. Thus, in some implementations, hub 10 creates an educational environment of accumulated experience, and allows the SU 100 to share information and benefit from the global knowledge accumulated by the student and educational community.

In an example implementation, the SU 100 can review the material that was identified as a valuable resource by other students in his class studying the current textbook material, or by students in his school that studied the current material in the past. In addition, in some implementations, the SU 100 can follow one or more students who are studying similar subject matter, and can view relevant information identified those students, even if the SU 100 and the followed students do not use the same textbook. For example, the SU 100 can select to follow one or more students that study similar subject material, even if the SU 100 is studying a textbook that was written by different authors, published by a different publishing house, written in a different language, and so forth. In some implementations, the SU 100 can select the languages in which he is fluent, and can indicate that he would like to receive relevant resources in the selected language. In some implementations, the SU can post questions directly to his teachers, and the response can be made available to all students in a particular class.

The SU 100 can access the hub 10 in a variety of ways. In an example implementation, the SU 100 downloads an educational hub client application (EHCA) and installs the software application on each device that provides access to his/her digital textbooks or application. The device can be, for example, a smart phone, a tablet, a laptop, an e-Book reader, a computing terminal, a personal computer, or any other current or future device capable of supporting an interactive operating system, applications, and device drivers. During an example download process, the target device is identified, and the appropriate version of the application is downloaded and installed on the user device. During the installation and setup process, the SU 100 may be required to authorize the EHCA to capture input and screen information from certain designed applications. The EHCA and hub 10 will monitor and provide applicable resources to these identified applications, and monitor how the user interacts with these applications. This can be implemented, for example, by the EHCA acting as system input device driver using Open Source libraries to capture keyboard/mouse/pen, gesture movement and an Open Source-Screen Capture Technology acting as a display driver that captures information being presented on the display at a region of the display used by the identified applications. The EHCA need not always be active. For example, in some implementations, the EHCA will only be active when the specified applications are active and in focus. If none of the specified applications is active or in focus, the EHCA can become inactive in the background and wait for a registered application to become active again.

A textbook application can be, for example, any type of standalone application, a website identified through a uniform resource locator (URL), or a proprietary application. In some implementations, the EHCA is active at the operating system (OS) level and interacts directly with the operating system. In these applications, the source and the format of the electronic textbook can vary, but does not affect the ability of the EHCA to perform and provide focused resources to the SU 100.

In an example implementation, to activate the EHCA dialog, the SU 100 clicks on an EHCA button. The EHCA button can be located on any suitable portion of a graphical user interface (GUI), for example beside window control buttons such as the "minimize," "maximize," and "close" buttons on the electronic textbook window. The educational hub client service (EHCS) invokes the EHCA interface and runs a process to parse the text presented on the electronic textbook's application window, and caches this information. The process also can collect information available via the OS that is related to the active electronic textbook, including, for example, the International Standard Book Number (ISBN), book name, author names, release date, version/revision, publisher, language, chapter information, page number, paragraphs number being viewed, and other information relevant to the electronic textbook and content being viewed. This information can be used to focus and customize search results for relevant content.

In some implementations, a client linguistic engine parser (CLEP) can be used to further interpret the content of the electronic textbook. For example, a CLEP can use a language parsing algorithm (e.g., Penn Treebank algorithms or other advanced language parsing algorithm) to eliminate some of the morphemes, determiners, auxiliary verbs, prepositions, and conjunctions from the parsed text content, while identifying and tagging each of the remaining part-of-speech elements and dependencies between individual words. Each element also can be tagged with its proximity to the main portion of text that is presently being displayed to the user in the electronic textbook interface.

A request and/or update message is formulated and posted to the educational hub requester server 116 over the Internet 110. Once the servers process the requests, the responder server 200 sends the results back to the SU 100, and the EHCA presents the results to the SU 100. This process is described in greater detail below.

In some implementations, during the registration process, the user can choose and enable other methods for receiving updates from the system. The user can specify, for example, that he would like to be informed via text message, email, registered social media site, or any other current or future applicable personal alerting technology, when any one of a particular set of selected users has posted an update related to an electronic textbook within his portfolio of registered and active textbooks. For example, the SU 100 can request to receive a text message alert via his smartphone whenever his teacher posts a message on the hub 10 related to a particular electronic textbook or subject of interest.

Teachers and other instructors 101 can interact with their students using the hub 10. For example, a student (e.g., SU 100) can post a request for clarification to the instructor 101, or post other comments related to a particular part of the studied material. The instructor 101 can reply to the request using the hub 10, and post clarification or other comments related to the request. The comments (as well as the original request) can be made immediately available to all other students of that particular class. In some implementations, by default, all communications between the students and their instructor will become available to all other the related users (e.g., other students participating in the same course) unless otherwise specifically specified by the teacher or instructor.

In some implementations, teachers and instructors 101 can view and interact with resources. For example, in some implementations, teachers and instructors 101 can view material that their students identify as relevant resources, provide feedback/comments as related to the resources, and/or mark the resources as a valuable (or not valuable) resources to their student audience. In some implementations, they can follow resources and trends categorized by students from other schools (e.g., students in a comparable school and participating in a comparable course). The teachers and instructors 101 can post their own comments as related to a particular paragraph/section of the digital textbook for their course audience viewing, or otherwise interact with the material.

In some implementations, during the registration process of the electronic textbook, a teacher or instructor 101 can specify that he or she is a faculty member of the particular educational institute and, in some cases, can identify the students in his class that are already registered with the system. As students (e.g., SUs 100) register their electronic textbooks with the system, they will be able to identify the attending school, and will be able to select the faculty member teaching that specific course.

In some implementations, during the registration process, the instructor 101 can choose (or disable) various methods to receive updates from the system. For example, the instructor 101 can specify that he would like to be informed via text message, email, registered social media site, or any other current or future applicable personal alerting technology, when a particular set of selected users is posted an update related to an electronic textbook within his portfolio of registered and active textbooks. For example, the instructor 101 can request to receive an email and a text message alert via his smartphone whenever a student posts a message on the system addressed directly to the teacher.

The EHCA used by the teachers and instructors 101 can be similar in functionality to the EHCA used by other users of the system, but can provide customized results to instructor 101, depending on the implementation.

Educational content providers 102 can develop customized applications to be used by the students (e.g., one or more SU 100) in a way that enhances the students' understanding of the topic in question and improve the students' learning experience. For example, in Electrical Engineering, when the subject of interest relates to a circuit with an identified voltage, volts and impedance ohms, an educational content provider 102 can provide an application provides the student with an interactive formula to find the current. Other implementations can include scheduling of off-line tutoring by other students, or on-line tutoring (free or for a fee) by an expert in the subject (e.g., using electronic whiteboard/chat room/instant messaging or any other current and future applicable technology). The educational content providers 102 can develop their content using the Educational Hub framework or by other methods, e.g., by developing stand-alone applications.

In some implementations, using the hub 10, a student (e.g., a SU 100) can rank a particular content provider resource, and provide comments on the applicability, usability, and value provided by the resource. The student can identify and save the resource for future reference, which can indicate to hub 10 the classification level of the resource, and that the resource is highly applicable to the subject matter at hand.

The EHCA interface used by the educational content providers 102 can be different from the interface used by a SU 100. For example, in some implementations, the interface provides the educational content providers 102 with multi-level selection criteria that identifies key words used in educational material. The educational content providers 102 can use these criteria to deliver their provided solution to a particular audience, or limit the solution to a particularly applicable subject. Once the content material is registered with the hub 10, the educational content providers 102 can continue to refine the solution based on the applicability rating provided by the SU 100.

Educational ad providers 103 can use the hub 10 to provide specific advertisements targeting students' needs (e.g., the needs of a SU 100) by subject studied, school location, and/or by education level.

The EHCA interface used by the educational ad providers 103 can be different from the interface used by a SU 100. For example, in some implementations, the interface can provide the educational advertisement providers 103 with multi-level selection criteria to identify subjects studied, demographic, level of education and other relevant attributes to identify and focus their advertisements on a specific target audience.

Publishers and authors 104 can use the hub 10 to obtain feedback regarding textbooks and other resources created by the publishers and authors 104. For example, publishers and authors 104 can use hub 10 to determine what students (e.g., one or more SUs 100 who are studying their electronic textbook) identify as a valuable resource, or to determine an area of the educational material that students find challenging. Authors and publishers 104 can also determine what students studying the same material, but who are using a different book from other publishers and authors, identified as a valuable resource. The hub 10 thus can serve as a valuable resource to the educational publishing sector in the development of educational material, and can help in the improvement of existing educational content. For example, in some implementations, instead of or in addition to spending resources with focus groups to improve their educational materials, publishers and authors 104 can obtain feedback from a large section of the student community very quickly using hub 10.

The EHCA interface used by authors and publishers 104 can be specific to the publishing sector. For example, in some implementations, the ECHA interface can provide the authors and publishers 104 with analytic reports related to their textbook and other textbooks focusing on related subjects.

In some implementations, during the registration process of the electronic textbook, authors and publishers 104 can provide information to authenticate the validity of their roles as authors and publishers of the electronic textbook/material.

In some implementations, other contributors to the educational eco-system 105 can be connected to the system.

Figure 1B:
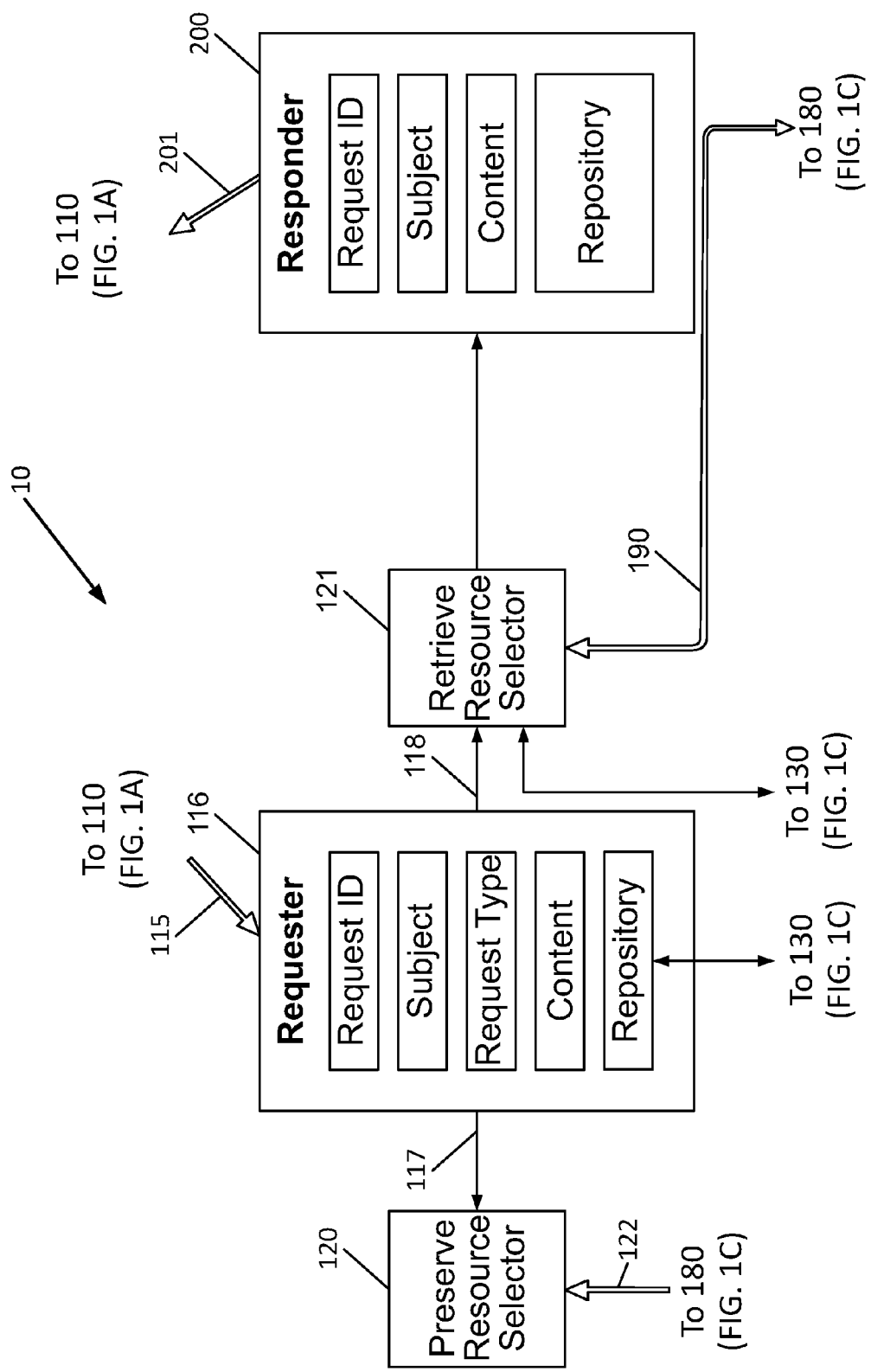

As shown in FIGS. 1A-B, clients 100-105 are connected through a network 110. In an example implementation, a secure Internet connection establishes a communication path between the clients 101-105 and the education hub servers 115 and 200. Client requests can be funneled, for example, through requester server 116, and communication responses can be pushed to the clients 100-105 via the responder server 200.

In an example implementation, requests coming to the hub 10 from clients 100-105 are directed for processing to the requester server 116 through a secure internet connection 115. The requester server 116 can dissect requests from the clients 105. For example, each request message can include several different data components, including a requester ID, subject, request type, content, and repository data components. Each of these example data components are described in greater detail below.

The requester ID data component can include unique identification of the entity or individual requesting the service/information from the hub 10. Once a user registers with the hub 10, the requester ID for that user can be stored in the users account and profiles database 181 and on each of the user's devices with an installed and registered copy of the EHCA. The same requester ID can be used for all interactions with the system at any role for that user, and for any subject, giving the user the ability to recall knowledge and references to materials that he interacted with in the past. The requester ID also can include a unique request identifier component, which is used to identify a specific request issued by the EHCA.

The subject data component can include information that is collected by the EHCA and is related to the active electronic textbook, including, e.g., ISBN, book name, author names, release date, version/revision, publisher, language, chapter information, page number, and paragraphs number being viewed. This information can be used to narrow and focus the results provided to the user based on the applicability of the result set to the requesting subject.

The request type data component can include information pertaining to the type of request being made. As an example, in some implementations, hub 10 can process three primary types of requests; register, post, and retrieve.

A register request is issued by the EHCA during the user registration process (during which new users are registered to hub 10) and during the electronic textbooks registration process (during which users register new books to be followed). The register request instructs hub 10 to store this data in the user account and profiles database 181 and generates a global unique requester ID that can be used for all succeeding interactions of the user with the hub 10.

The post request is issued for any new records creation, data updates, or data deletion in the hub's data storage 133. This can include, for example, the selection and exclusion of a resource from a user selected list of relevant resources, changes in resource priority, and additions or changes to a user's comments/notes. The post request type can be issued automatically by the EHCA when a user makes selections or updates information on the EHCA user interface.

The retrieve request can be used to retrieve information from hub 10. For example, in some implementations, a retrieve request can be issued automatically by the EHCA when the focus of an electronic textbook application interface changes as a user scrolls through the textbook.

The content data components can serve multiple purposes based on the type of request. For example, for a register request, the content data component can include user provided data pertaining to the user registration process, for example a user's name, address, and so forth. The content data component can also include information gathered from the active textbook (e.g., ISBN, book name, and so forth) during the textbook registration process. In some implementations, if the content data does not require linguistic engine 130 services, the messages can be forwarded as is to the preserve resource selector 120 for further determination as to which record in the users account and profile database 181 needs to be updated.

For a post request, the content data component can include information determined using the EHCA CLEP. In an example implementation, when the user issues a post request, the content data component can include textual information from the currently active electronic textbook. In some implementation, the content data element will only contain information that was originally processed from a registered active textbook. In some implementations, the content data will require the linguistic engine 130 services, and will be forwarded for processing with the request ID and subject data. The linguistic engine 130 identifies synonyms related to each key word of the posted data as related to the subject of the electronic textbook, based on linguistics rules of the language (e.g., English, French, Spanish, or other language). For example, for a subject related to computer technology, the term "mouse" could be considered to be an input device, not a mammal. On the other hand, if the electronic textbook subject is related to biology, the term "mouse" could be interpreted as a mammal. The processed results of the linguistic engine 130 are returned to the requester server 116 for further processing. The data of the content element can be used to store or retrieve information into/from the content 182 databases of the hub's data storage 133.

For retrieve request, the content data component can hold similar information as in the post request type, discussed above. For example, the retrieve request can request linguistic engine 130 services and can follow the same process described above for the post request context data component example described above. The processing results of the linguistic engine 130 can be returned to the requester server 116 for further processing. The data of the content data component can be used to retrieve related data from the content 182 databases of the hub's data storage 133. By identifying a repository of synonyms related to each key word provided in the content data component, the data handling engine 180 can identify and select existing referral resources captured by other users of the system and stored as a reference in the educational hub data repository 185.

The repository data component can hold data provided or selected by the user in reference to the content data element components. It can contain, for example, the actual data that will be used by the hub 10 to generate and provide the accumulative knowledge. Like the content data components, the repository data components can serve multiple purposes based on the type of request.

For a register request, the repository data component contains the user information need to be posted in the user account and content database 181.

For a post request, the repository data component includes information about resources that the user finds applicable to the data in the requester message's content data component and would like to save for future reference. The repository data component can include, for example, a note or a clarifying comment left by the users as related to material viewed in the electronic textbook's interface, or a link to a resource that he identifies as a valuable resource. Furthermore, if the resource is provided by the hub 10, the unique reference number provided by the system, and information about the priority that the user identified for the resource can be included in the repository data component of the post request. As the process continues, the repository data component of the post request can be processed by the data handling engine 180 of the hub's data storage 133 and can be stored in the educational hub data repository 185. If the resource is a new resource from an external electronic source, the EHCA can provide a cached link or image of the resource, including any priority information, comments, highlights, and any other notation provided by the user as related to the new resource. The cached link can be processed by the data handling engine 180 and stored in web resource cache 184 database.

For a retrieve request, the repository data component identifies (if provided) the type of resource that the user is seeking, for example, on-line tutoring, an on-line formula related to the viewed textbook material, or an interactive tutorial.

The requester server 116 forwards all register requests and post requests, along with any related data retrieved by the linguistic engine 130, to the preserve resource selector 120 server though a connection 117 (e.g., a network connection). The preserve resource selector 120 handles prioritizing requests and balancing the load on the data handling engine 180.

Figure 1C:
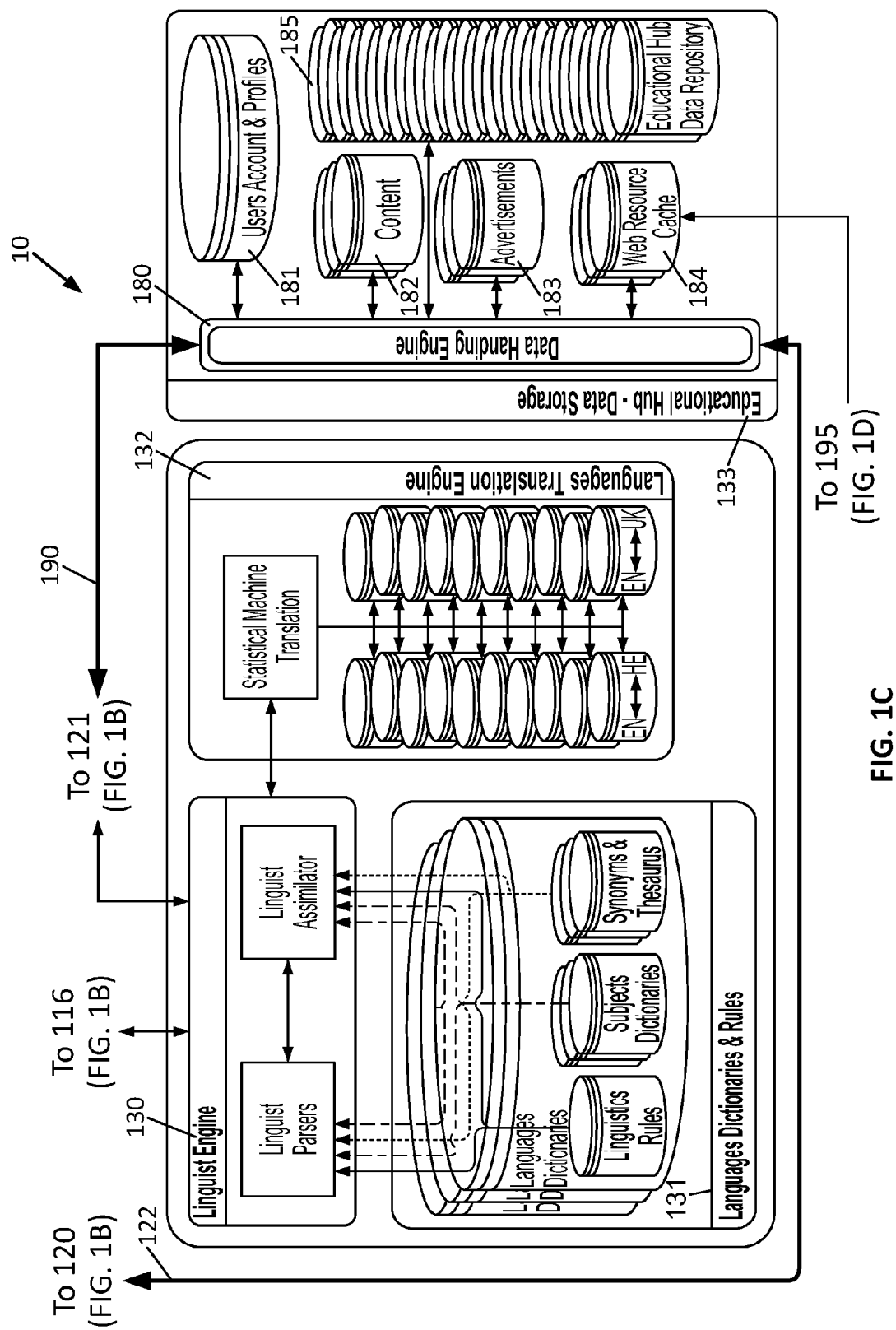

As shown in FIGS. 1B-C, The requester server 116 forwards retrieve request type messages, along with any related data fetched by the linguistic engine 130, to the retrieve resource selector 121 server through a connection 118 (e.g., a network connection). The retrieve resource selection 121 handles prioritizing requests and balancing the load on the data handling engine 180.

The preserve resource selector 120 controls the flow of requests going into the hub's data storage 133, and provides the data handling engine 180 with information identifying which database needs to be updated. In an example implementation, when educational content provider 102 submits an Advanced Algebra calculator application to the system, the availability of the application can be queued while the system deals with register/post/retrieve requests (e.g., from SU 100, and teachers and instructors 101), and becomes active only when the data handling engine 180 identifies and links the educational hub data repository data 185 and the content data 182 that can benefit from the new application. In some implementations, the preserve resource selector 120 also can provide data load balancing and prioritization of all requests to update data in the hub's data storage 133.

The retrieve resource selector 121 controls the flow of requests going into the hub's data storage 133 and provides the data handling engine 180 with information identifying which database needs to be retrieved and the priority of the request. The retrieve resource selector 121 generates the data retrieval request, and provides load balancing, prioritizing, and queuing of all requests to retrieve data from the hub's data storage 133. In an example implementation, when the hub 10 is loaded with data requests, the retrieve resource selector 121 can highly prioritize certain requests, e.g., the requests for data identified/provided by the teachers or instructors 102 as applicable resources. The retrieve resource selector 121 sends the data to the responder 200, which formulates the data and pushes it to the SU 100. The retrieve resource selector 121 can continue to communicate with the hub's data storage 133 and the data handling engine 180 to complete the request for additional data applicable to the SU 100 data retrieval request. The priority for retrieving data for the user can be derived from various factors, for example, based one or more settings provided by the user in his account profile, or his book profile.

Communication between the preserve resource selector 120 and the data handling engine 180 of the hub's data storage 133 can be bi-directional. In an example implementation, while most requests will be submitted by the preserve resource selector 120, and some requests (for example, as discussed above) in the preserve resource selector 120 may require that the data handling engine 180 update the preserve resource selector 120 on resources and job completion related to assigned tasks. A bi-directional communication can be provided to eliminate the possibility of overwhelming the system and provide the mechanism to insure data integrity, depending on the implementation.

As shown in FIG. 1C, the linguistic engine 130 identifies and assembles various variations of the phrase message sent in for processing by the requester server 116 or the retriever resource selector 121. This information can be used, for example, when the user specifies in a profile (e.g., in his profile or in a textbook specific profile) that hub 10 should provide content data results in languages other than the original electronic textbook language. For example, a user fluent in the German language studying in France, using a French textbook, can specify in his user profile that results obtained for any subject of interest can be provided additionally in the German language. In some implementations, by default, the hub 10 provides available results from the hub's data storage 133 in the original language of the electronic textbook. In some implementations, the linguist engine 13 can use existing off-the-shelf products and solutions. As an example, some implementations utilize the "Google Search Appliance" products or "Perfect Search Appliance" products, or any other similar products or technologies as they become available.

The language dictionaries and rules database 131 can include information from existing language resources (e.g., dictionaries, language specific linguistics rules, subject dictionaries, synonyms and thesaurus resources), to identify word definitions similar to words passed by the requester server 116, or by the language translation engine 132, to identify related data to be retrieved. Several components of the language dictionaries and rules database 131 can use a different type of current and future technologies to access and retrieve results. For example, some databases dictionaries and licenses can be hosted as part of the language dictionaries and rules database 131, some can be retrieved using web services or other online data retrieval mechanism, and some can be fully developed as part of the language dictionaries and rules database 131. In some implementations, various components of the language dictionaries and rules database 131 can be implemented using the "Google Search Appliance" products or "Perfect Search Appliance" products, or any other products or similar products or technologies as they become available.

The language translation engine 132 receives requests from the linguistic engine 130 when the user indicates in his profile or in the textbook specific profile that hub 10 should provide content data results in languages other than the original electronic textbook language. In some implementations, the requests message contains particular information, for example requester ID information obtained from the requester server 116, a source language code (e.g., an ISO 639-5 identifier), one or more words to be translated, and a target language code (e.g., an ISO 639-5 identifier). The languages translation engine 132 can use existing language translation tools and technology (e.g., Google Translate) or others. In some implementations, the languages translation engine 132 can utilize the "Google Search Appliance" products or "Perfect Search Appliance" products, or any other similar products or technologies as they become available.

The hub's data storage 133 allows hub 10 to collect, store, and analyze relevant information that the users of hub 10 (e.g., clients 100-105) find valuable, such as resources related to a specific electronic viewing material segment (e.g., an electronic textbook or portion of an electronic textbook). The preserve resource selector 120 posts requests to store the information for future reference, and the retrieve resource selector 121 retrieves ranked stored resources from the hub's data storage 133. These resources are presented to the clients 100-105 of hub 10 based on each users' preference and the applicability of the reference to the material viewing segment. Data storage 133 can be thought of as the center of the hub 10, and stores the accumulated knowledge of its clients 100-105. As more clients use hub 10, the data storage 133 can accumulate a collection of related information and data, analyze it, and rank it based on the ratings results of past and present users. Thus, in some implementations, data storage 133 enables hub 10 to provide search results that grow more focused and relevant over time. In some implementations, the data storage 133 can utilize the "Google Search Appliance" products or "Perfect Search Appliance" products, or any other similar appliance or technologies as they become available.

Hub 10 also includes a data handling engine 180. Data handling engine 180 can store, index, and query the various databases of hub 10. For example, data handling engine 180 can interact with users account and profiles databases 181 (which store user specific data as related to his preference and studying material), the content 182 database (which holds metadata collected from the studying material, such as e.g., electronic textbooks), and the educational hub data repository 185 (which preserves information identified by the SUs 100, or teachers and instructors 101 as related to material in the content 182). In some implementations, the data handling engine 180 can also adapt to user behavior and learn to deliver better results over time. For example, in some implementations, resources that gets more clicks from users with similar profiles in the users account and profiles databases 181 might indicate that more users are interested in a particular resource, and will cause the resource to automatically move up in future search results.

The user account and profiles database 181 can hold data specific to registered users of the hub 10. This data can include, for example, information provided by the user during the registration process, device registration, and content (e.g., electronic textbook) registration process. In some implementations this data can also include demographic profile information, which can be used during the queries of the hub 10 databases to provide fine-tuned and more precise data knowledge results. In some implementations, the information in the user account and profiles database 181 can continue to be refined as the user continues to interact with the EHCA and as the data handling engine 180 continuously monitors the user's trends and behavioral patterns.

The content databases 182 capture metadata of the requester server 116, for example content data components from a post request (containing, e.g., content from a textbook). The EHCA can obtain this information various ways, for example by using existing Open Source-Screen Capture Technology to parse the information presented on the user-registered application (e.g., an electronic textbook). The content data component in a post request can be processed by the data handling engine 180, which categorizes the information and store the metadata in content database 182 according a particular standard. As an example, data can be stored within content databases 182 according to existing and future standard, such as the IEEE Learning Technology Standards Committee (LTSC), Learning Object Metadata, WG12, Aspect, CEN WS-LT, and other global standards.

For a retrieve request from the requester server 116, the data of content databases 182 can be used in conjunction with other data to identify and retrieve applicable repository results from the educational hub data repository databases 185. As an example, the content metadata stored in content databases 182 and attributes from the user account and profiles database 181 can be used to identify and retrieve applicable repository results from the educational hub data repository databases 185.

The advertisement database 183 includes data pertaining to advertisements server by hub 10. In some implementations, the advertisement database 183 can be similar to existing search engine advertisements, and can capture and provide applicable ads based on demographic information and material specific to the learning subject presented on the user-registered application (e.g., an electronic textbook). Advertisement can be submitted by users of hub 10. For example, in some implementations, advertisements can be submitted to hub 10 by educational content providers 102 wishing to provide customized solutions to improve the learning experience of SUs 100. In another example, in some implementations, advertised can pertain to services that might not be directly associated with the learning subject or academic material, but might otherwise be of interest to the SU 100 (e.g., an advertisement to order pizza).

Figure 1D:
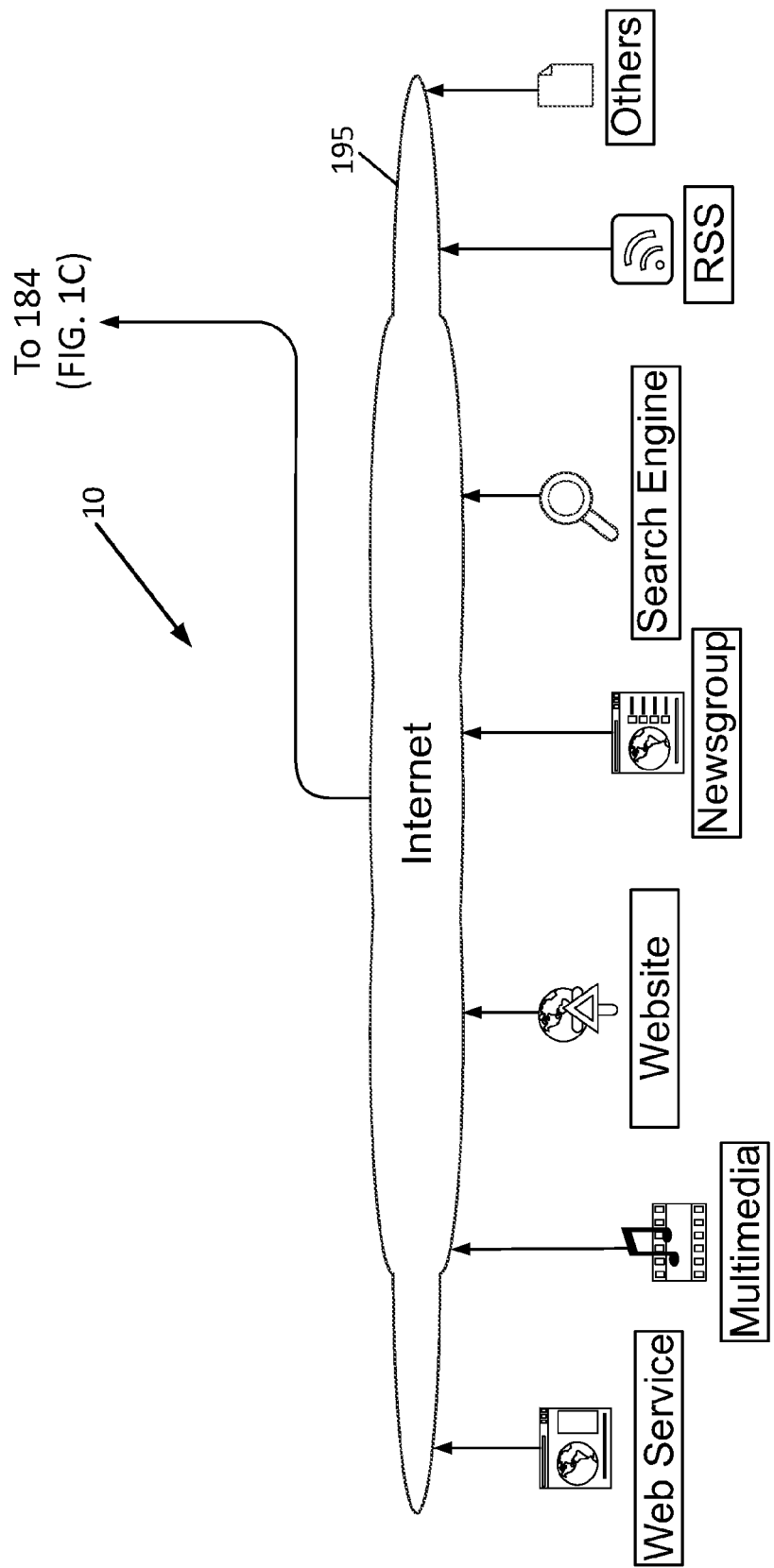

The web resource cache 184 retains web-based information for use as reference material. In some implementations, web resource cache 184 can be similar to existing search engine cache pages (e.g., Yahoo.com search results web cache), and the web resource cache 184 can keep a snapshot of the page, as it appeared when it was referred by a user, and store it as reference material. In some implementations, this saved version of the web page can be used for collecting and categorizing the metadata used to analyze and rank the reference in a search. In some implementations, the page may have changed since it was last cached, and the user can be provided with an active link to the current page. As shown in FIGS. 1C and 1D, in some implementations the web resource cache 184 can perform (e.g., over the Internet 195) web indexing or other methods of indexing the content of web sites. As examples, web resource cache 184 can index web pages of various web services, multimedia (e.g., images, audio, video), newsgroups, search engine results, rich site summary (RSS) data, or other information that is accessible via the Internet 195.

The educational hub data repository 185 captures metadata from the repository data component of post request type messages from the requester server 116. This can include, for example, multimedia, website page, newsgroup, RSS, student notes, and other information that the user identified as a valuable source that he would like to refer to in relationship to information presented on the user registered application. The data handling engine 180 can parse the metadata from the request message in order to reference, catalog, and categorize the metadata, such that it can be stored in the educational hub data repository 185. In some implementations, data handling engine 180 can parse and interpret the metadata using techniques such as ontologies mapping for semantic interoperability. In some implementations, some elements of the storage process can follow existing and future standards, and such the IEEE Learning Technology Standards Committee (LTSC), Resource Aggregation Models for Learning, Education and Training, WG13, Aspect, CEN WS-LT, and other global standards.

In some implementations, for retrieve requests from the requester server 116, the content data component of the request can be used in conjunction with other data to identify and retrieve applicable repository results from the educational hub data repository databases 185. For example, repository results can be retrieved from educational hub data repository databases 185 based on the content metadata and data from the user account and profiles databases 181.

Communication between the retrieve resource selector 121 and the data handling engine 180 of the hub's data storage 133 can be bi-directional. In an example implementation, while most requests will be retrieved by the retrieve resource selector 121, some requests, for example multi language retrieval requests, may require the linguistic engine 130 to support the use of multilingual vocabularies (e.g., through the use of standards such as LRE Thesaurus) to assemble a list of vocabularies. This allows for automated translation of resources stored in the hub's data storage 133 that have been indexed in other languages.

The responder server 200 posts a response from hub 10 back to the clients (e.g., clients 100-105). In some implementations, each response message can include various data components, for example request ID, subject, content, and repository data components. The information can be sorted based on the ranking complied by the data handling engine 180, which is driven from information from the users account and profiles database 181 of the specific user and of users having similar profiles. Examples of this information are described in detail below.

The request ID data component of the responding message identifies the specific request message that was issued by the EHCA and funneled to the requester server 116. The request ID data component can be used by the EHCA to provide the information back to the user making the request.

The subject data component of the responder message corresponds to the subject data component of a corresponding request message that was issued by the EHCA and funneled to the requester server 116. In some implementations, including this data component allows the EHCA to cache the data related to the requesting source and align referenced results provided by the responder server 200 with information presented on the studying material.

The content data component of the responder message corresponds to the content data component of a corresponding post or retrieve request message that was issued by the EHCA and funneled to the requester server 116. The content data component can be used by the EHCA as part of data to be cached for the alignment of references.

The repository data component of the responder message can differ depending on the type of request that was made. For example, if a retrieve request was made to the requester server 116, the repository data component of the responder message can include data identified by the hub's data storage 133 and the retrieve resource selector 121 as resources applicable to the reference at hand, for the specific user and for the specific request. In another example, if a post or register request was made to the requester server 116, the repository data component can contain the results of the request and any additional data that was generated by the hub's data storage 133 as part of executing the request. For example, during user registration process, the repository element can contain the unique requester ID assigned to the user.

A responder message from the hub's servers (e.g., responder server 200) can be transmitted to the requesting users (e.g., clients 100-105) through a network connection 201. In some implementations, network connection 201 can be a secure Internet connection.

The appearance and functionality of the educational hub client application (EHCA) can vary, depending on the implementation. For instance, EHCA can be compatible with one or more operating systems. In an example, the EHCA can be compatible with Microsoft Windows, Apple OSX, Linux, Unix, Apple iOS, Android, or other operating system.

A user can interact with EHCA in a variety of ways, depending on the application. In an example implementation, the user (e.g., a client 100-105) downloads the EHCA from an appropriate distribution website (e.g., a website associated with hub 10), and follows standard installation procedures as traditionally are performed within the user's operating system. This can include, for example, reviewing licensing agreements and authorizing the application to collect and analyze information from learning material applications. In some implementations, upon completion of the EHCA installation process, the user can be introduced to the functionality of the application (e.g., through an on-screen tutorial). The user can also be prompted to follow a user registration and validation process. In some implementations, the user can be asked to provide additional demographic information. In some implementations, the user can be asked to provide contact information, such that hub 10 can provide communication and notification information to the user. This contact information can include, for example, an email address, telephone number (e.g., for calls or text messages), and a social media user name (e.g., a user name for Twitter of Facebook).

After installation, the EHCA interacts with the user within the operating system environment. In some implementations, the EHCA can be visible on all GUI windows of the operating system. For example, the EHCA can be visible as an icon on the title bar, or in another location of a GUI window that is readily visible to the user. In some implementations, the EHCA can switch between different operational states, and can indicate these different states through the icon.

In some implementations, the EHCA can have an "off" state. This off state can be indicated in various ways, for instance using an EHCA icon of a particular color (e.g., gray or a light color) or shape. When the EHCA is in the off state, the hub 10 is not monitoring any information from the user's display and is not capturing any input, usage or data from the user's system. In some implementations, the EHCA can be silent at this stage, and can remain in a standby mode until triggered. As examples, the EHCA can be triggered when a user focuses on a registered application or registered website (e.g., by activating the application or website and bringing it to the forefront of his GUI).

The user can register applications and websites in a variety of ways. In an example implementation, the user can register a particular application (indicating that EHCA should follow the content of the application) by clicking on the EHCA icon. The user is presented with the registration process for the content. Once the user confirms that he would like to register the application, the EHCA proceeds to collect information about the registered application's metadata and present it to the user for review and confirmation. In some implementations, the user can provide addition information, for example information about the educational institute that he attending, the course for which the content is been studied, and the teacher or instructor leading the course, and other information relevant information. In some implementations, additional information can include information regarding students, courses, and institutions that the user would like to follow. As an example, the user can follow other students taking the same course, and students from other institutions taking similar courses. Once content registration is completed, the EHCA turns on (e.g., enters an "on" state) and the user becomes a member of the subject matter's educational community.

The EHCA's "on" state of can be indicated in various ways, for instance using an EHCA icon of a particular color (e.g., red) or shape. In the on state, the EHCA and hub 10 monitors information from the user's display and captures input, usage, and data from the user's system. The EHCA can obtain this information in various ways, for example by using existing Open Source-Screen Capture Technology to parse the information presented on the user-registered application. A student user 100 can interact with the EHCA in an active state, for example, as described above. In some implementations, the hub 10 and ECHA are available to the user only when the GUI window of a registered application is active and in focus.

In some implementations, the EHCA can have an "active" state. This active state can be indicated in various ways, for instance using an EHCA icon of a particular color (e.g., green) or shape. When the EHCA is in the active state, the EHCA and hub 10 are on (e.g., monitoring and collecting information from the user's system), the EHCA GUI is active, and the EHCA GUI is presenting information relating to a specific application identified by the "active" icon. This can be beneficial, for example, if several registered applications are open simultaneously, and can allow the user to quickly identify which registered application is related to the information represented in the EHCA GUI.

Figure 2:
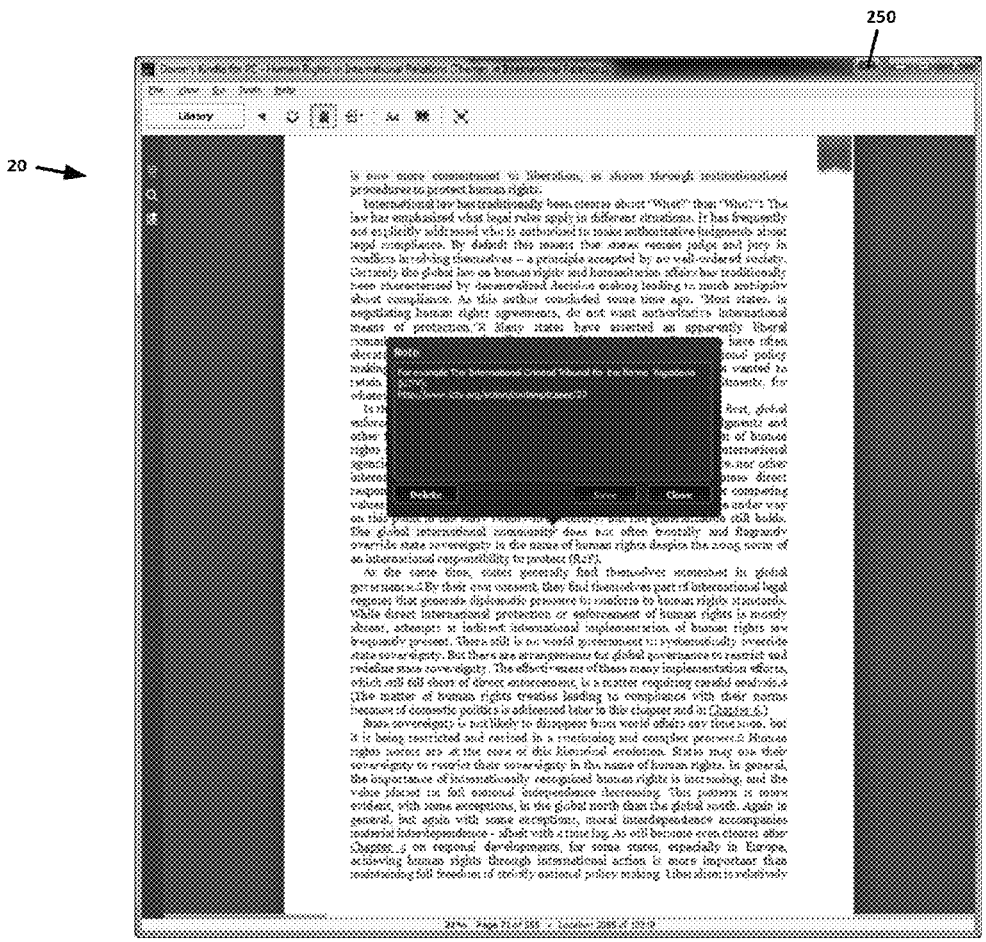
FIG. 2 shows an example screen capture of a user's device.

In some implementations, the EHCA and hub 10 can be used in conjunction with an electronic textbook. For instance, interaction with an electronic textbook can be captured, analyzed, and stored in the hub's data storage 133, and can be referred to by the user or other users with similar profiles or ranking of resources. FIG. 2 shows an example screen capture 20 of a user's device when an electronic textbook application is open. In this example, the icon 250 indicates that the EHCA in the "on" state, and indicates that the EHCA is on and interacting with the material presented on the content interface (e.g., the content of the electronic textbook), but the EHCA GUI is not active. To open the EHCA GUI interface, the user can click on the icon 250. In some implementations, by default the EHCA GUI interface can become active when the user initially starts registered content (e.g., a particular registered electronic textbook). In some implementations, if the user chooses to close the EHCA GUI interface, this method can provide the user with a way to re-activate the GUI interface as needed.

Figure 3:
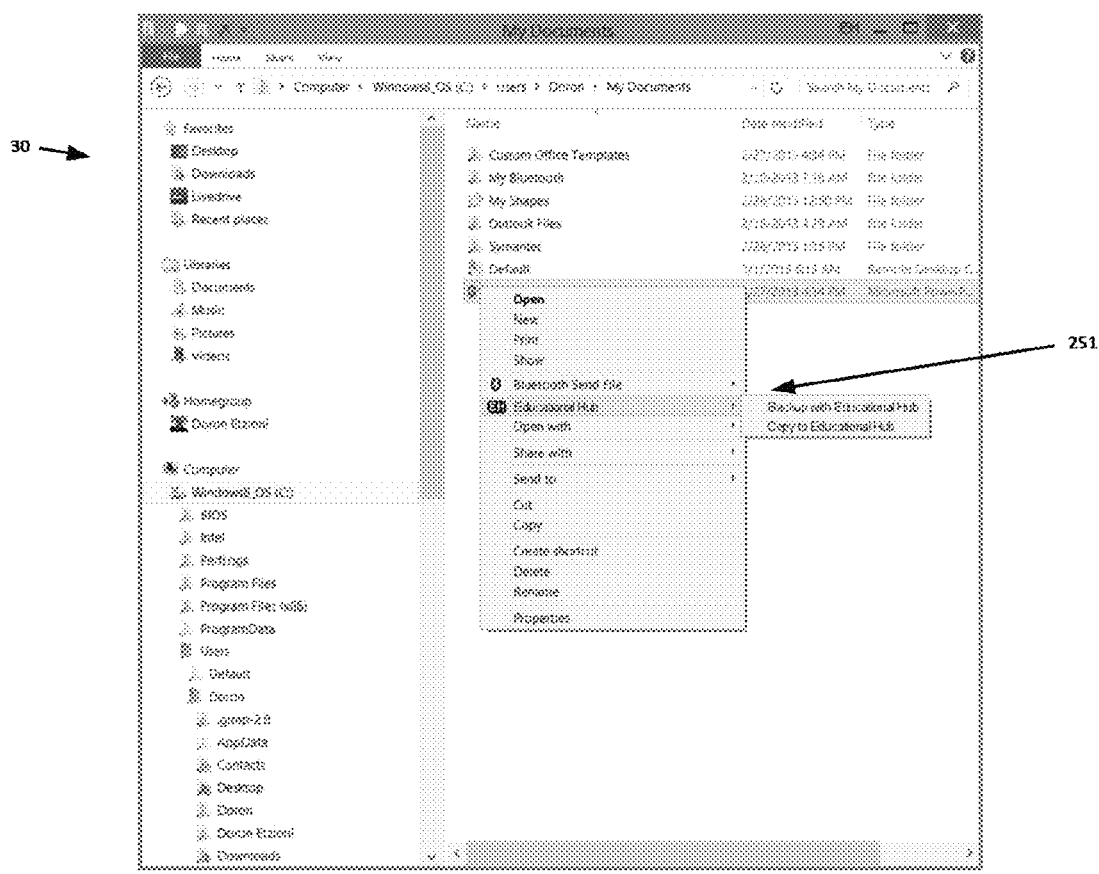
FIG. 3 shows another example screen capture of a user's device.

In some implementations, during the installation of the EHCA, additional context menu options can be added to various elements of the operating system interface. For example, as shown in FIG. 3, context menu options 251 can be added to the user interface 30 of a file explorer application (e.g., an application used to examine the file structure of a user's local or remote storage facilities). Context menu options 251 allow a user to selectively perform a variety of functions. For example, in some implementations, a user can use context menu options 251 to attach files to a specific section of the content as reference material. In another example, if the user has more than one registered content open (e.g., two different electronic textbooks), the users can use context menu options 251 to specific which registered content that the file should be referred to. The EHCA will issue a post request to the requester server 116, and upload the selected file as a referenced material to the content section selected by the user.

Figure 4:
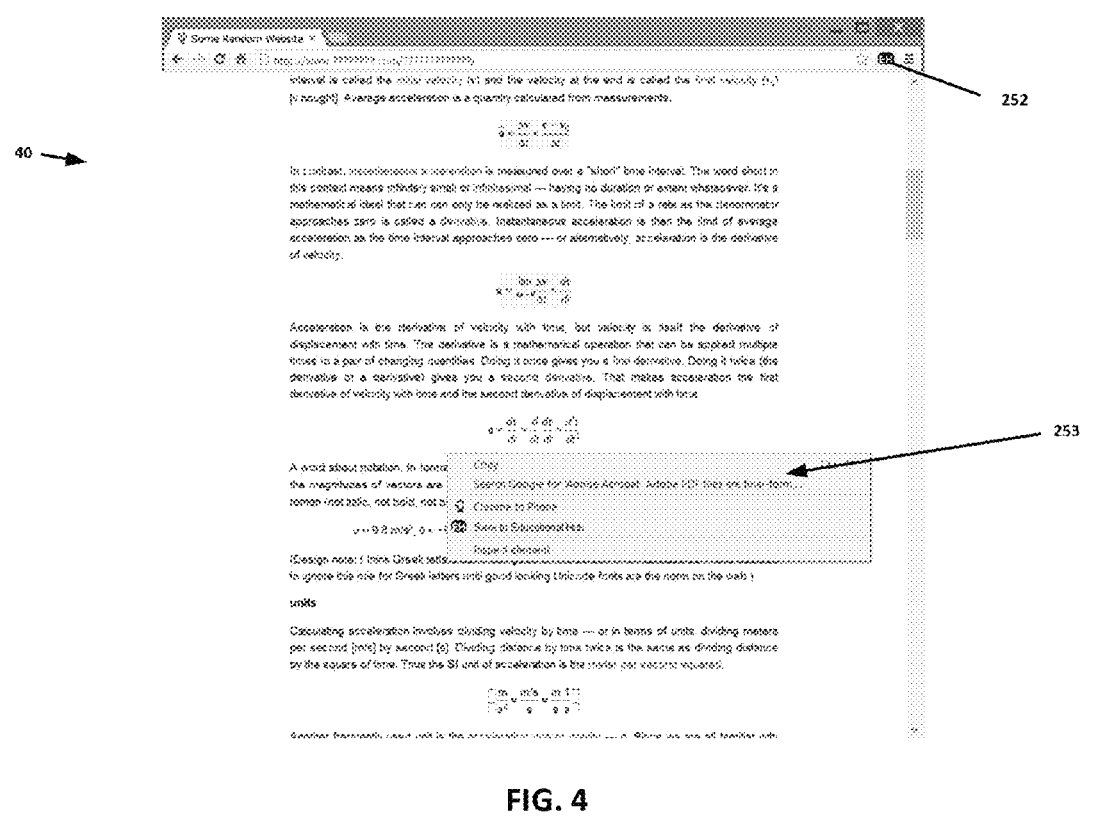

As shown in FIG. 4, in some implementations, during the installation of the EHCA, additional context menu options 253 can added to the user interface 40 of a web browser. The context menu options 253 allow the user to save the currently viewed page to a specific section of the content as a reference material. In some implementations, if the user has more than one opened registered content open (e.g., two different electronic textbooks), the user can use context menu options 253 to select which registered content the file should be referred to. The EHCA will issue a post request to the requester server 166, and provide the page URL and a cached copy of the web page as a referenced material to the content section selected by the user.

In some implementations, the an icon 252 can be positioned on the web browser's bookmark bar, and icon 252 can allow the user to specify if the present URL is an address for registered content. If the user specifies that the present URL points to content that he would like to register (e.g., a URL pointing to an electronic textbook), the EHCA will parse page, identify metadata components that can help in identifying the content, and identify any additional metadata tags can be used to analyze the content. This information can be stored in a database of hub 10, for example in the content database 182. In the example above, the icon 252 indicates that EHCA is in an "active," and that the EHCA GUI interface is currently active.

Figure 5:
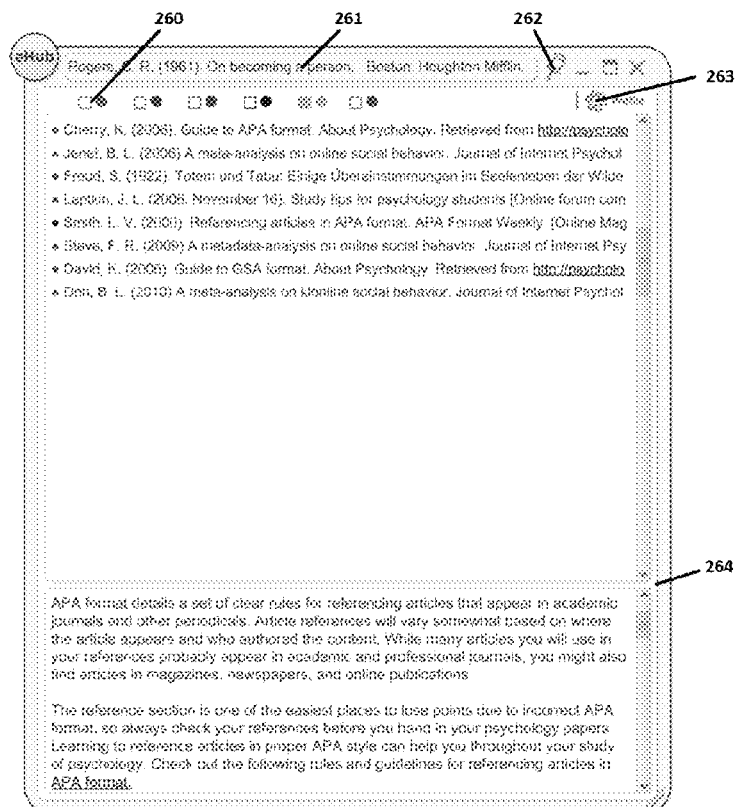
FIG. 5 shows an example of a user interface for an educational hub client application.

An example EHCA GUI 50 is shown in FIG. 5. In some implementations, the EHCA GUI provides ranked references to the content presented on the registered application. The references can include a collection of continuously updated information and cumulative knowledge that has been collectively compiled by the user community of hub 10. The resources in the collection can be categorized and ranked based on their applicability to the user. This can be determined, in part, based on information about the user's profile and studying pattern, among other factors.

In some implementations, the interface can become active and available as soon as a registered content window become focused (e.g., active and at the forefront of the user's GUI). The information presented in the EHCA windows can be precisely adjusted to follow information presented on focused window of the registered content. For example, at the top section of the EHCA window interface, the EHCA can provide a list of relevant content (e.g., based on applicable user profile and customized rankings), and on the lower portion of the EHCA window interface, the EHCA can display the information from a particular selected resource from the top portion of the EHCA window interface. This presented information can change, depending on the content being viewed (e.g., based on the electronic textbook being viewed or the specific section of the textbook being viewed).

In some implementations, the user can reprioritize the result set, and move item to a new position of choice. Every adjustment can trigger a post requester message to requester server 116, indicating a particular change that should be made to the databases of hub 10. For example, if a user adjusts the order of the result set, the requester message can indicate that the user's profile should be updated accordingly, and that particular data (e.g., information from the selected resource) should be stored in data storage 133. In some implementations, the user can add additional resources using some of the methods highlighted above, which can also trigger appropriate post requester messages to requester server 116.

In some implementations, the EHCA interface can have additional elements. For example, in some implementations, the EHCA can include an area that lists categories of available resources (e.g., area 260 of FIG. 5). Area 260 can display, for example, web pages, other electronic books, blogs, on-line tutoring, and other available resources. In some implementations, each category of resources can be presented in a category, and the user can hide or show certain categories (e.g., by clicking on a box next to a matching color or icon associated with category).

In some implementations, the EHCA interface includes an area that indicates the title of the present electronic textbook (e.g., area 261 of FIG. 5).

In some implementations, the EHCA interface includes an area that allows the user to "pin" the EHCA window as the top window of the display (e.g., area 262 of FIG. 5).

In some implementations, the EHCA interface can include a setting dialog that allows the user to update his profile and preferences that relate to the associated electronic textbook. For example, as shown in FIG. 5, the setting dialog can be initiated by clicking on the area 263.

In some implementations, the EHCA interface can include interface elements that allow the user to resize the graphical window of the EHCA interface (e.g., area 264 of FIG. 5).

Implementations of the subject matter and the functional operations described above can be implemented in digital electronic circuitry, or in computer software, firmware, or hardware, including the structures disclosed in this specification and their structural equivalents, or in combinations of one or more of them. Implementations of the subject matter described in this specification, such as storing, maintaining, and displaying artifacts can be implemented as one or more computer program products, i.e., one or more modules of computer program instructions encoded on a tangible program carrier, for example a computer-readable medium, for execution by, or to control the operation of, a processing system. The computer readable medium can be a machine readable storage device, a machine readable storage substrate, a memory device, a composition of matter effecting a machine readable propagated signal, or a combination of one or more of them.

The term "system" may encompass all apparatus, devices, and machines for processing data, including by way of example a programmable processor, a computer, or multiple processors or computers. A processing system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, executable logic, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Computer readable media suitable for storing computer program instructions and data include all forms of non-volatile or volatile memory, media and memory devices, including by way of example semiconductor memory devices, e.g., EPROM, EEPROM, and flash memory devices; magnetic disks, e.g., internal hard disks or removable disks or magnetic tapes; magneto optical disks; and CD-ROM and DVD-ROM disks. The processor and the memory can be supplemented by, or incorporated in, special purpose logic circuitry. Sometimes a server (e.g., a cloud system 110) is a general purpose computer, and sometimes it is a custom-tailored special purpose electronic device, and sometimes it is a combination of these things. Implementations can include a back end component, e.g., a data server, or a middleware component, e.g., an application server, or a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

Certain features that are described above in the context of separate implementations can also be implemented in combination in a single implementation. Conversely, features that are described in the context of a single implementation can be implemented in multiple implementations separately or in any sub-combinations.

The order in which operations are performed as described above can be altered. In certain circumstances, multitasking and parallel processing may be advantageous. The separation of system components in the implementations described above should not be understood as requiring such separation.

A number of implementations have been described. Nevertheless, it will be understood that various modifications can be made without departing from the spirit and scope of the invention. Accordingly, other implementations are within the scope of the claims.

What is claimed is:

1. A method for facilitating collaboration between users comprising:
    obtaining, from a plurality of user devices:
        monitoring information corresponding to monitored interactions between a plurality of users and at least one electronic resource; and
        content identified respectively by each of the plurality of users as relevant to the at least one electronic resource;
    indexing, on a server system, the content based on the monitoring information;
    parsing content from a portion of an electronic resource being displayed by a particular user's device, wherein the content is parsed into different grammatical parts-of-speech elements;
    transmitting a subset of the parsed content including some, but fewer than all, of the different grammatical parts-of-speech elements from the particular user's device to the server system;
    identifying indexed content relevant to the particular user based on the monitoring information and the subset of the parsed content received from the particular user's device; and
    displaying, on the particular user's device, content relevant to the particular user, wherein the displayed content includes content identified by another user as relevant to the at least one electronic resource.

2. The method of claim 1, wherein the at least one electronic resource is an electronic textbook.

3. The method of claim 1, wherein the content identified by another user as relevant comprises another electronic resource.

4. The method of claim 1, wherein the content identified by another user as relevant a comment, note, or annotation created by the other user.

5. The method of claim 1, wherein the content identified by another user as relevant to the at least one electronic resource comprises a reference to another electronic source, a website, a service, or an advertisement.

6. The method of claim 1, further comprising obtaining, from each user device, feedback information regarding displayed content.

7. The method of claim 6, wherein identifying indexed content relevant to the particular user is further based on feedback information received from each user device.

8. The method of claim 1, wherein the monitoring information corresponds to an identity of at least one electronic resource.

9. The method of claim 1, wherein the monitoring information obtained from each user device corresponds to one or more key words associated with the portion of the at least one electronic resource being viewed by the respective user of the user device.

10. The method of claim 1, wherein identifying indexed content relevant to the particular user is further based on a popularity of the content.

11. The method of claim 10, wherein identifying indexed content relevant to the particular user is further based on the popularity of the content with respect to a subset of the plurality of users.

12. The method of claim 11, wherein the subset of users are users who are similar with respect to at least one pre-determined criterion.

13. The method of claim 12, wherein the criterion corresponds to an academic course currently taken by the users.

14. The method of claim 12, wherein the criterion corresponds to an academic institution currently attended by the users.

15. The method of claim 11, wherein the subset of users is selected by the particular user.

16. The method of claim 1, wherein indexed content relevant to the particular user is identified based on at least one of:
    a linguistic dependency between two or more textual elements of the subset of the parsed content,
    a proximity between two or more textual elements of the subset of the parsed content, and
    an ontological meaning of one or more textual elements of the subset of the parsed content.

17. The method of claim 1, wherein identifying indexed content relevant to the particular user comprises:
    identifying at least one textual element having a similar meaning as a textual element of the subset of the parsed content.

18. The method of claim 1, further comprising:
    automatically parsing the content from the portion of the electronic resource being displayed by the particular user's device; and
    automatically transmitting the subset of the parsed content from the particular user's device to the server system.

19. The method of claim 1, wherein the content relevant to the particular user is displayed alongside the at least one electronic resource.

20. The method of claim 1, further comprising:
    determining that a different portion of the electronic resource is being displayed by the particular user's device; and
    responsive to determining that the different portion of the electronic resource is being displayed by the particular user's device, automatically displaying additional content relevant to the different portion.

21. The method of claim 1, wherein the content relevant to the particular user is displayed according to a relevance ranking.

22. The method of claim 21, wherein the relevant ranking is determined based on at least one of the following:
    a ranking of the content received from another user,
    an amount of time that another user viewed the content,
    a demographic of the particular user, and
    a time that the content was published.

23. The method of claim 1, wherein the displayed content includes content identified by an instructor or publisher of the at least one electronic resource as relevant to the at least one electronic resource, wherein the instructor or publisher is distinct from the plurality of users.

24. A system comprising:
one or more processors; and
a computer program product encoded on a tangible, non-transitory storage medium, the product comprising computer readable instructions for causing one or more processors to perform operations comprising:
  obtaining, from a plurality of user devices:
    monitoring information corresponding to monitored interactions between a plurality of users and at least one electronic resource; and
    content identified respectively by each of the plurality of users as relevant to the at least one electronic resource;
  indexing the content based on the monitoring information;
  receiving a subset of content that was parsed into different grammatical parts-of-speech elements, the content representing a portion of an electronic resource being displayed by a particular user's device, wherein the subset of the content includes some, but fewer than all, of the grammatical parts-of-speech elements;
  identifying indexed content relevant to a particular user based on the monitoring information and the subset of parsed content received from the particular user's device; and
  transmitting, to each user's device, the content identified as relevant to that user, wherein the transmitted content includes content identified by another user as relevant to the at least one electronic resource.

25. The system of claim 24, wherein the content identified by another user as relevant to the at least one electronic resource comprises another electronic resource.

26. The system of claim 24, wherein the content identified by another user as relevant to the at least one electronic resource comprises a reference to another electronic source, a website, a service, or an advertisement.

27. The system of claim 24, wherein the monitoring information corresponds to an identity of at least one electronic resource.

28. The system of claim 24, wherein the monitoring information obtained from each user device corresponds to one or more key words associated with a portion of the at least one electronic resource being viewed by the respective user of the user device.

29. A system apparatus comprising:
one or more processors; and
a computer program product encoded on a tangible, non-transitory storage medium, the product comprising computer readable instructions for causing one or more processors to perform operations comprising:
  monitoring interactions between a user and at least one electronic resource;
  generating monitoring information based on the monitored interactions;
  receiving, from the user, content identified by the user as relevant to the at least one electronic resource;
  parsing content from a portion of an electronic resource being displayed by the apparatus, wherein the content is parsed into different grammatical parts-of-speech elements;
  transmitting the monitoring information and a subset of the parsed content including some, but fewer than all, of the different grammatical parts-of-speech elements to a server;
  receiving content relevant to the user from the server, wherein the content relevant to the user is identified based on the monitoring information and the subset of the parsed content received and the subset of the parsed content by the server from the apparatus; and
a display device configured to display the content relevant to the user, wherein the displayed content includes content identified by another user as relevant to the at least one electronic resource.

30. The apparatus of claim 29, wherein the content identified by another user as relevant to the at least one electronic resource comprises a comment, note, or annotation created by the other user.

* * * * *

UNITED STATES PATENT AND TRADEMARK OFFICE
CERTIFICATE OF CORRECTION

PATENT NO. : 9,454,622 B2
APPLICATION NO. : 14/205079
DATED : September 27, 2016
INVENTOR(S) : Doron Etzioni and Daniel Harris Etzioni Page 1 of 1

It is certified that error appears in the above-identified patent and that said Letters Patent is hereby corrected as shown below:

In the Claims

Column 23, Line 26, Claim 24, delete "transmiting," and insert -- transmitting, --.

Signed and Sealed this
Sixth Day of August, 2019

Andrei Iancu
*Director of the United States Patent and Trademark Office*